No. 751,258. PATENTED FEB. 2, 1904.
M. CARSTENS.
STEEL SCREW.
APPLICATION FILED SEPT. 3, 1903.
NO MODEL.
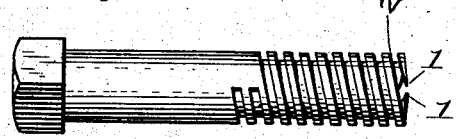
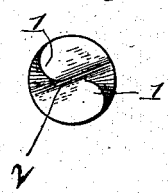
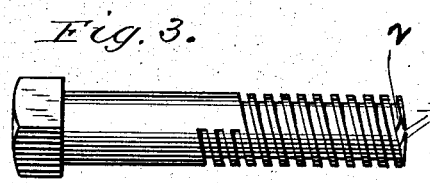
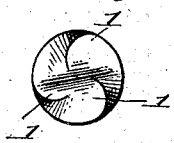
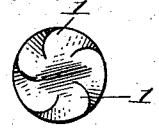
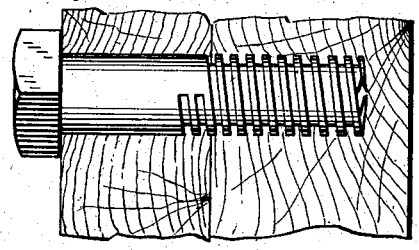
Witnesses
Magnus Carstens
Inventor
By his Attorneys Davis & Davis No. 751,258. Patented February 2, 1904.

UNITED STATES PATENT OFFICE.

MAGNUS CARSTENS, OF DAVENPORT, IOWA.

STEEL SCREW.

SPECIFICATION forming part of Letters Patent No. 751,258, dated February 2, 1904.

Application filed September 3, 1903. Serial No. 171,737. (No model.)

*To all whom it may concern:*

Be it known that I, MAGNUS CARSTENS, a citizen of the United States, residing at Davenport, county of Scott, State of Iowa, have invented certain new and useful Improvements in Steel Screws, of which the following is a specification, reference being had therein to the accompanying drawings, in which—

Figure 1 is a side elevation of a double-thread screw; Fig. 2, an end view thereof; Fig. 3, a side elevation of a three-thread screw; Fig. 4, an end view thereof; Fig. 5, an end view of a five-thread screw, and Fig. 6 a detail view showing the screw securing together two strips of material.

The object of this invention is to provide a square-thread screw of the same diameter throughout its length and which will cut its own way or thread in the strips of material to be secured together.

Referring to Figs. 1 and 2, it will be noted that the screw is formed with two threads, the ends of each thread being tapered and beveled inward to form a cutting-lip 1, the said lips being diametrically arranged, as shown in Fig. 2. It will be observed that the end of the screw is cut inward from opposite sides substantially V shape, as shown at 2, so that the cutting-lips at the ends of the threads are slightly in advance of the point of the V-cut in order that the said lips will quickly and positively engage the material into which the screw is to be threaded. As there is no cutting center to this screw, it will be necessary before the screw can be inserted to bore a hole of the same diameter as the core of the screw, so that the threads of the screw will merely have to cut their own way in the material. Heretofore when it was desired to use screws of this character it was necessary to first thread the openings to receive the screws; but it is obvious that this threading may be avoided by providing the cutting-lips, as described, to enable the screw to cut its own way.

In Figs. 3 and 4 the screw is provided with three threads, so that three cutting-lips will be formed thereon, the end of each thread being beveled to form a cutting-lip and the end of the screw being inwardly cut, as shown.

It is desirable that the core of the screw— that is, the body of the screw between the base of the threads—be cut away to permit the cutting-lips to take hold of the material quickly and positively.

In Fig. 5 the screw is provided with five threads, and the end of each thread is formed into a cutting-lip, thereby providing five of these lips arranged at equal distances apart around the screw.

These screws may be used not only in securing strips of wood together, but in securing together pieces of comparatively soft metal.

In order that the said screws may be forced into metal, the cutting-lips are to be hardened and tempered. It is desirable that the threads for a considerable distance from the end of the screw be also tempered to withstand the strain brought upon them when forcing the screws into metal.

The screws, as shown in the drawings, are provided with square threads, but it is obvious that they may be of any desired form. It is of course obvious that any desired number of threads may be formed on the screw, a cutting point or lip being formed at the entering end of each thread. In the drawings screws having two, three, and five threads are shown; but I desire it understood that I may form four threads thereon or six or more threads, if that number be found desirable and practicable.

Having thus described my invention, what I claim as new, and desire to secure by Letters Patent, is—

A screw whose body portion is of substantially the same diameter throughout and is provided with a plurality of threads said threads terminating at points equal distances apart around the end of the screw and being beveled inward at said ends to form substantially radial cutting edges which are carried inward to a point beyond the base of the threads, the axial center of the screw being cut inward at the end thereof whereby the cutting edges or lips will be in advance of the center or core of the screw.

In testimony whereof I hereunto affix my signature, in the presence of two witnesses, this 11th day of June, 1903.

MAGNUS CARSTENS.

Witnesses:
ED. VON BERGEN,
F. C. SUSEMIEHL.